(12) United States Patent
Sellappa et al.

(10) Patent No.: US 11,736,400 B2
(45) Date of Patent: Aug. 22, 2023

(54) NETWORK TRAFFIC ENGINEERING WITH MULTI-VIRTUAL ROUTING AND FORWARDING LOOKUP

(71) Applicant: Arista Networks, Inc., Santa Clara, CA (US)

(72) Inventors: Sriram Sellappa, Santa Clara, CA (US); Anil Joshi, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/462,725

(22) Filed: Aug. 31, 2021

(65) Prior Publication Data

US 2023/0064425 A1 Mar. 2, 2023

(51) Int. Cl.
*H04L 45/745* (2022.01)
*H04L 45/00* (2022.01)
*H04L 45/586* (2022.01)

(52) U.S. Cl.
CPC ............ *H04L 45/745* (2013.01); *H04L 45/54* (2013.01); *H04L 45/586* (2013.01)

(58) Field of Classification Search
None
See application file for complete search history.

(56) References Cited

U.S. PATENT DOCUMENTS

| | | | | |
|---|---|---|---|---|
| 9,853,898 B1* | 12/2017 | Subramanian | ........ | H04L 45/586 |
| 10,027,587 B1* | 7/2018 | O'Brien | ............... | H04L 45/745 |
| 10,341,259 B1* | 7/2019 | Singh | ...................... | H04L 45/42 |
| 10,623,315 B1* | 4/2020 | Singh | .................... | H04L 45/586 |
| 2011/0032843 A1* | 2/2011 | Papp | ....................... | H04L 45/50 370/254 |
| 2014/0269250 A1* | 9/2014 | Bhikkaji | ............. | H04L 41/0668 370/216 |
| 2020/0099615 A1* | 3/2020 | Mittal | ..................... | H04L 45/74 |

* cited by examiner

*Primary Examiner* — Benjamin Lamont
(74) *Attorney, Agent, or Firm* — Sprinkle IP Law Group

(57) ABSTRACT

A method for network traffic forwarding using multi-virtual routing and forwarding instances forwarding lookups is provided. The method includes: receiving network traffic on an interface of a network device associated with a first virtual routing and forwarding instance (VRF) fallback policy specifying a first set of rules; making a first determination that the network traffic includes network traffic information matching the first set of rules; initiating execution of VRF lookups in a plurality of VRFs programmed in the network device to obtain a set of VRF lookup results; making a second determination, using the set of VRF lookup results and the first VRF fallback policy, that the network traffic is to be forwarded using a first VRF among the plurality of VRFs; and initiating, based on the second determination, forwarding of the network traffic using the first VRF.

19 Claims, 11 Drawing Sheets

NETWORK TRAFFIC ENGINEERING WITH MULTI-VIRTUAL ROUTING AND FORWARDING LOOKUP

BACKGROUND

A communication system may enable devices to communicate with one another. The communication system may include devices that relay information from one device to another device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Figure 1A:
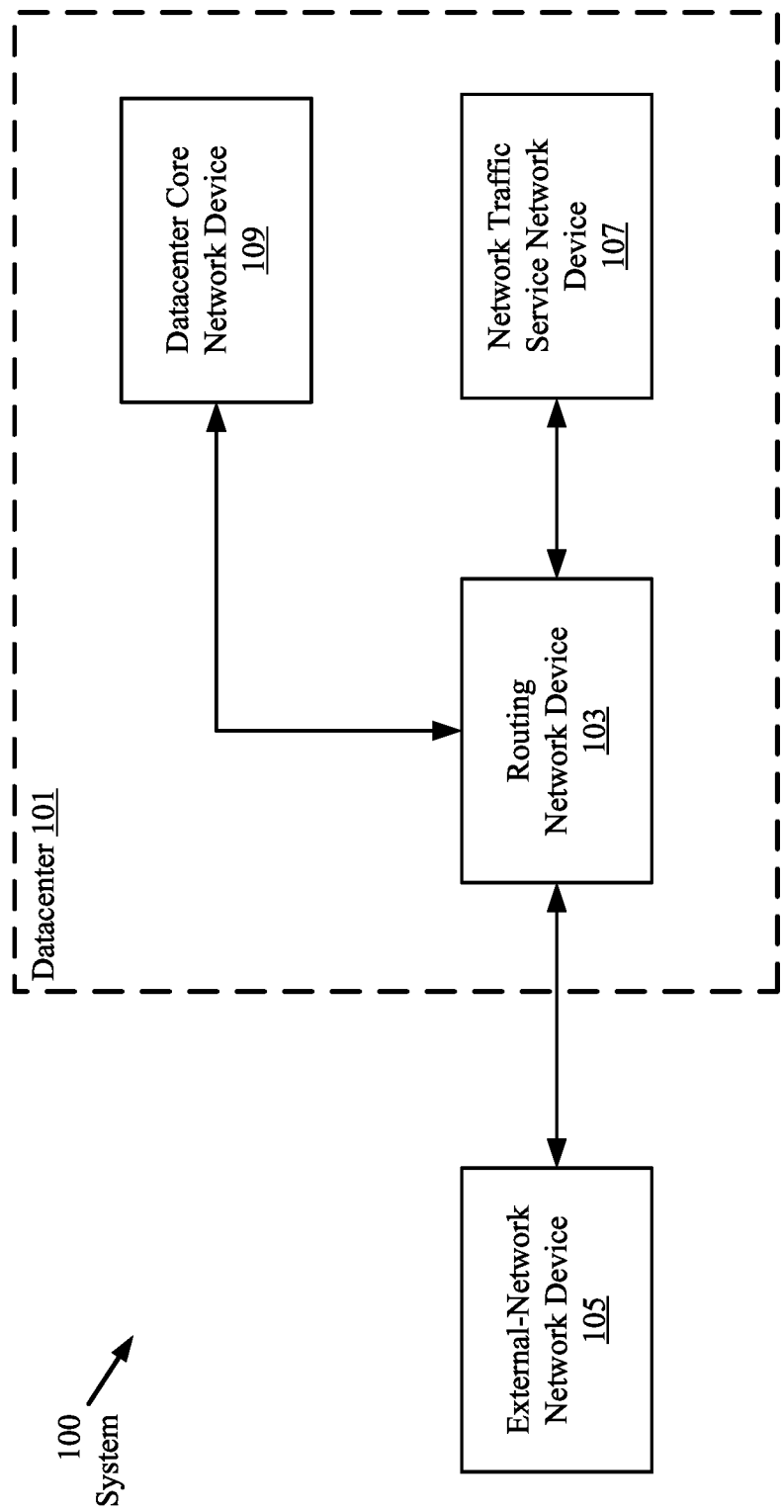
FIG. 1A shows a system in accordance with one or more embodiments described herein.

Specific embodiments will now be described with reference to the accompanying figures.

Virtual routing and forwarding instances (hereinafter referred to as "VRFs") allows multiple routing tables to co-exist within a single network device (e.g., router) in IP-based computer networks (e.g., a Wide-Area Network (WAN)). This enables the network device to set up different forwarding paths for different purposes (e.g., Distributed Denial of Service (DDOS) mitigation). However, conventional multiple VRF lookup (herein referred to as "multi-VRF lookup") configurations require network traffic (e.g., data packets) received by the network device to be continuously recirculated after a lookup is executed for each VRF. This not only increases a latency in the network traffic processing but also requires additional computing resources for the recirculation.

Embodiments of this disclosure provide multiple VRF lookups in a single pass without having to recirculate network traffic after each VRF lookup. In particular, all lookups for VRFs programmed in the network device may be executed in parallel, or serially within groups (where the lookups for the VRFs in each group are performed in parallel) upon receipt of the network traffic. The VRF for processing the network traffic is selected based on a set of VRF priorities determined using a VRF hierarchy specified in a set of rules established in a VRF fallback policy. The VRF hierarchy establishes a fallback VRF for each VRF programmed in the network device.

The following describes a non-limiting example in accordance with one or more embodiments. Turning to the example, assume that a network device is programmed with three VRFs: (i) a non-network-traffic-service VRF; (ii) a network traffic service VRF; and (iii) a default VRF. The non-network-traffic-service VRF allows all matching traffic to bypass a network traffic service (e.g., Dynamic Denial Of Service (DDOS) mitigation, encryption, firewall network traffic filtering, deep network traffic inspection and/or processing, etc.), the network traffic service VRF forwards all matching traffic to one or more network devices providing one or more of the network traffic services, and the default VRF forwards all matching traffic directly to a core device of a datacenter. A VRF fallback policy may be configured to establish different hierarchies between these three VRFs. For example, the VRF fallback policy may include a hierarchy establishing the network traffic service VRF as a fallback of the non-network-traffic-service VRF, and the default VRF as a fallback of the network traffic service VRF. This hierarchy establishes the following set of VRF priorities: non-network-traffic-service VRF>network traffic service VRF>default VRF, i.e., the non-network-traffic-service VRF has a higher priority than the network traffic service VRF, which in turn has a higher priority than the default VRF. The results of the lookup at each VRF for a network traffic are compared to the set of VRF priorities to select the VRF for processing the network traffic.

Because all of the VRF lookups can be conducted in parallel (i.e., at a same time) or consecutively within a single pass without needing to recirculate the network traffic after each lookup, the latency in the network traffic processing can advantageously be reduced. Computing resources of the network device previously required to recirculate the network traffic can also be saved, which advantageously improves computer functionality (e.g., the processing capabilities) of the network device.

Additionally, in one or more embodiments, the VRF fallback policy may also establish which VRF may be overruled in the VRF lookup process. For example, an external-facing interface of the network device may be associated with a VRF fallback policy specifying that the network traffic service VRF should be a starting VRF for executing the VRF lookup (i.e., that a result from the non-network-traffic-service VRF is not needed). This indicates that any network traffic received at this external-facing interface should never be forwarded by the non-network-traffic-service VRF. As a result, a VRF lookup at the non-network-traffic-service VRF will not be conducted at all for the network traffic received at the external-facing interface (i.e., no VRF lookup requests are sent to VRFs that do not need a result). Alternatively, depending on a configuration of a hardware of the network device, a dummy lookup request including an invalid VRF identifier (ID) (i.e., an ID that uniquely identifies the VRF from the set of VRFs implemented by the network device) is generated and used during the non-network-traffic-service VRF lookup to generate an artificial miss (i.e., an intentional failed matching) result during the non-network-traffic-service VRF lookup.

Furthermore, in one or more embodiments, network traffic may be decapsulated after a VRF lookup. In particular, the network device may be configured to determine during a first VRF lookup whether the network traffic is encapsulated. Based on determining that the network traffic is encapsulated, the network device decapsulates the network traffic prior to the next consecutive (i.e., second) VRF lookup.

Various embodiments of the disclosure are described below.

FIG. 1A shows a system (100) in accordance with one or more embodiments of the disclosure. The system (100) includes a datacenter (101) comprising a routing network device (103), a network traffic service network device (107)

and a datacenter core network device (109). The system (100) further includes an external-network network device (105) that is operatively connected to the routing network device (103) of the datacenter (101). Each of these components of system (100) is described below.

In one or more embodiments disclosed herein, a datacenter (101) may generally refer to a facility that centralizes information technology (IT) operations and equipment associated with an organization. More specifically, the datacenter may refer to a repository where data, pertaining to the organization, may be stored, managed, processed, and disseminated. Further, a datacenter may substantively include tools and/or collectors (e.g., the routing network device (103), the network traffic service network device (107), and the datacenter core network device (109)) for data analysis.

In one or more embodiments disclosed herein, the routing network device (103) is a physical device that includes persistent storage, memory (e.g., random access memory), one or more processor(s), and two or more physical ports. Each port may or may not be connected to another device (e.g., the network traffic service network device (107), the datacenter core network device (109), and/or the external-network network device (105)). The routing network device (103) may be configured to receive network traffic (e.g., data packets) via the ports and determine whether to drop the network traffic, process the network traffic in accordance with one or more embodiments of the disclosure, and/or process the network traffic in a control plane of the routing network device (103). The routing network device may also be configured to include one or more VRFs for processing and routing the network traffic.

The persistent storage in the routing network device (103) may include any type of non-transitory computer readable medium that stores data. For example, the data in the persistent storage may be instructions, which, when executed by one or more processor(s) in the routing network device (103), enable the routing network device (103) to perform all or a portion of the functions described in accordance with one or more embodiments of the disclosure (see e.g., FIGS. 2A-3D).

Examples of the routing network device (103) include, but are not limited to, a router, an edge router, a switch, and a multilayer switch. The routing network device (103) is not limited to the aforementioned specific examples. For example, the routing network device (103) may also be a computing device (see, e.g., FIG. 4) configured to operate as any of the above components. Additional details about the routing network device (103) are described below with respect to FIG. 1B.

In one or more embodiments disclosed herein, the network traffic service network device (107) is a physical device that includes persistent storage, memory (e.g., random access memory), one or more processor(s), and two or more physical ports similar to that described above for the routing network device (103). The network traffic service network device (107) may be configured to receive network traffic (e.g., data packets) via the ports, perform network traffic services (e.g., Distributed Denial of Service (DDOS) mitigation, encryption, firewall network traffic filtering, deep network traffic inspection and/or processing, etc.) on the received network traffic, and, as appropriate, send the processed network traffic to another device (e.g. the routing network device (103)) via the ports.

Although only a limited number of network traffic services are listed above, one of ordinary skill in the art would appreciate that any type of processing applied to the network traffic may qualify as a network traffic service without departing from the scope of one or more embodiments disclosed herein. For example, processing of the network traffic may also entail, but is not limited to, filtering, mirroring, storing, forwarding or blocking, transcoding, encrypting and decrypting, logging, redirecting or re-routing, authenticating, or any combination thereof.

Moreover, examples of the network traffic service network device (107) may include, but are not limited to, a network security device (e.g., a firewall device, a DOS attack scrubber, a virtual private network (VPN) device, an intrusion detection device, etc.), a network filtering device (e.g., a proxy server, a web content filter, etc.), a network data cache (e.g., a web-cache device), and a network management device (e.g., a load balancing device, a bandwidth management device, a wide area network (WAN) optimization or acceleration device, etc.).

In one or more embodiments disclosed herein, the datacenter core network device (109) is a physical device that includes persistent storage, memory (e.g., random access memory), one or more processor(s), and two or more physical ports similar to that described above for the routing network device (103). In particular, the datacenter core network device (109) may be a host of the datacenter (101). Examples of a host may include, but are not limited to, a server (e.g., a database server, a dynamic host configuration protocol (DHCP) server, an application server, a file server, a print server, a mail server, or any other server), or any other type of computing system that includes at least the aforementioned minimum requirements.

In one or more embodiments disclosed herein, the external-network network device (105) is a physical device that includes persistent storage, memory (e.g., random access memory), one or more processor(s), and two or more physical ports similar to that described above for the routing network device (103). The external-network network device (105) may include the above-discussed functionalities of one or more of the routing network device (103), the network traffic service network device (107), and the datacenter core network device (109). In the context of this disclosure, an external-network network device (105) may be any network device that is external to (i.e., outside of and/or not part of an internal network of) the datacenter (101).

Additional details about the routing network device are now described below with respect to FIG. 1B.

Figure 1B:
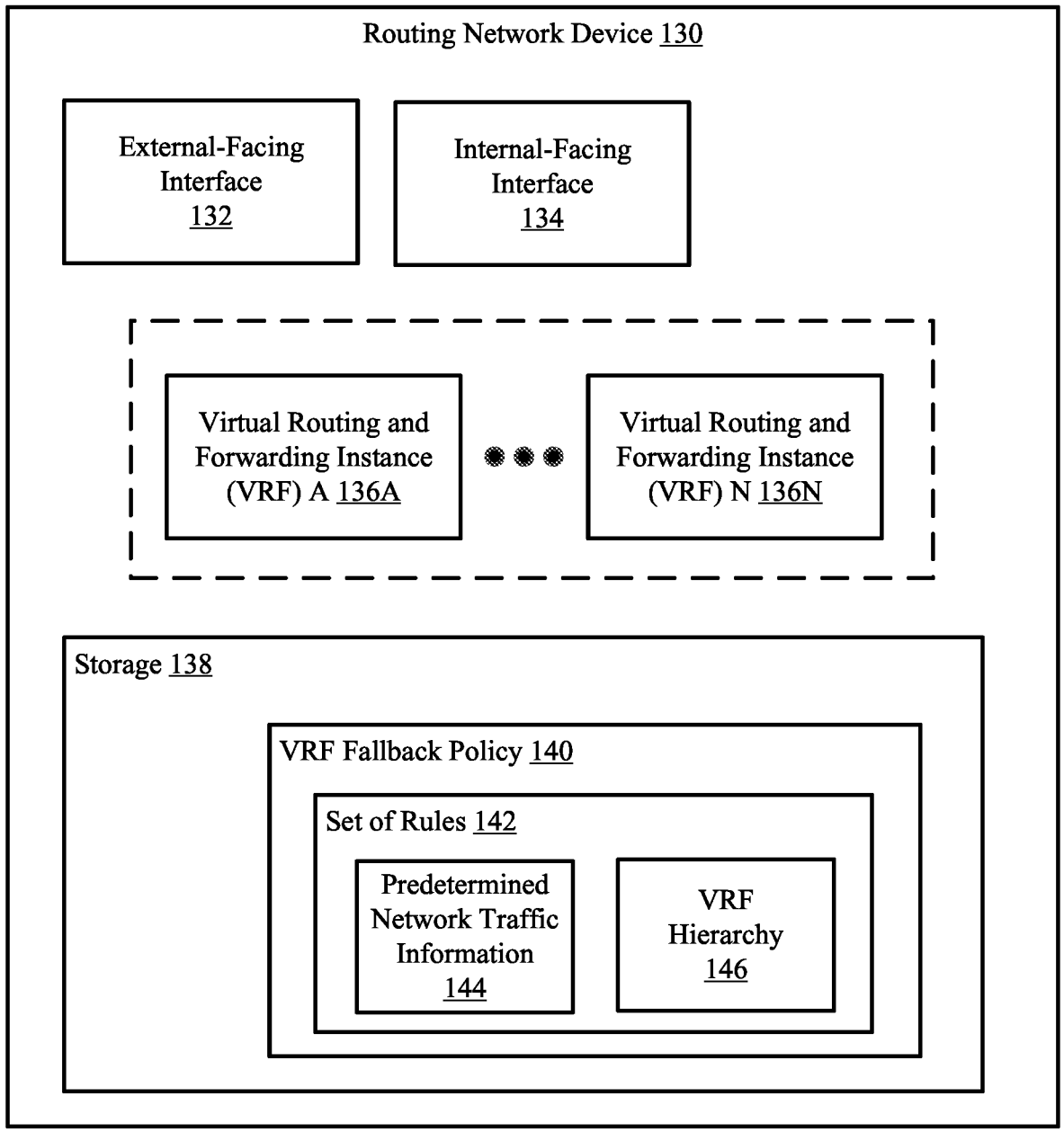
FIG. 1B shows a diagram of a routing network device in accordance with one or more embodiments disclosed herein.

In particular, turning now to FIG. 1B, FIG. 1B shows a routing network device (130) in accordance with one or more embodiments of the disclosure. The routing network device (130) may be the same as the routing network device (103) described above in FIG. 1A. In addition to the components discussed above in reference to FIG. 1A, the network device (130) further includes: an external-facing interface (132); an internal-facing interface (134); one or more VRFs (136A-136N); and a storage (138). Each of the components illustrated in FIG. 1B is described below.

In one or more embodiments disclosed herein, the external-facing interface (132) is a physical port operatively connected only to other devices outside of (i.e., external to) a datacenter (e.g., 101, FIG. 1A) to which the routing network device (130) belongs. In particular, the external-facing interface (132) may be an ingress port of the routing network device (130). In one or more embodiments, the network device (130) may have multiple ones of the external-facing interface (132) connected to multiple devices outside of the datacenter (101).

In one or more embodiments disclosed herein, the internal-facing interface (134) is a physical port that is operatively connected only to other devices within the datacenter (e.g., 101, FIG. 1A) to which the routing network device (130) belongs. In particular, the internal-facing interface (134) may be another ingress port of the routing network device (130). In one or more embodiments, the network device (130) may have multiple ones of the internal-facing interface (134) connected to multiple devices within the datacenter (101).

In one or more embodiments disclosed herein, each of the VRFs (136A, 136N) may be implemented in software (i.e., in layer-3 of the Open Systems Interconnection model (OSI model)) and be configured to act like a logical router. In particular, each VRF (136A, 136N) may include one or more forwarding tables (i.e., VRF lookup tables) that designate a next hop (i.e., next destination) of network traffic received by the routing network device (130) through the external-facing interface (132) and/or the internal-facing interface (134). Each VRF (136A, 136N) may also be used to create a separate virtual private network (VPN) to enable VPN routing and forwarding using the routing network device (130).

In one or more embodiments disclosed herein, the storage (138) is implemented using devices that provide data storage services (e.g., storing data and providing copies of previously stored data). For example, storage (138) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

In one or more embodiments disclosed herein, the storage (138) is configured to store at least one VRF fallback policy (140). The VRF fallback policy (140) may be used to determine which VRFs (136A, 136N) are to be selected to perform VRF lookups when the routing network device (130) receives network traffic. The VRF fallback policy (140) also establishes a fallback arrangement between each of the selected VRFs (136A, 136N). In particular, the VRF fallback policy specifies a set of rules (142) including a predetermined network traffic information (144) and a VRF hierarchy (146), each of which will be described in more detail below. Multiple ones of the VRF fallback policy may be stored in the storage (138).

In one or more embodiments disclosed herein, the predetermined network traffic information (144) includes information that can be matched to information included in a network traffic (namely, a header of a network traffic) received by the routing network device (130). For example, the predetermined network traffic information (144) may be, but is not limited to, a destination internet protocol (IP), value specifying a packet header length, etc. Moreover, in one or more embodiments, the predetermined network traffic information (144) may also include information about a port (e.g., the external-facing interface (132) and/or the internal-facing interface (134)) at which the network traffic is received. For example, the predetermined network traffic information (144) may also be, but is not limited to, a transmission control protocol (TCP) port number and/or name.

In one or more embodiments disclosed herein, the VRF hierarchy (146) specifies a hierarchical relationship between the VRFs (136A, 136N) specified by the VRF fallback policy (140) (i.e., the VRFs selected to perform VRF lookups when the routing network device (130) receives network traffic). This hierarchical relationship between the VRFs (136A, 136N) establishes a set of priorities for the VRFs (136A, 136N). For example, a VRF (136A, 136N) at a highest position within the VRF hierarchy (146) has a higher priority to be selected to perform network traffic forwarding than the other VRFs (136A, 136N) in the VRF hierarchy (146), or vice versa.

In one or more embodiments disclosed herein, when multiple ones of the VRF fallback policy (140) are stored in the storage (138), each VRF fallback policy (140) will include a different set of rules (142). In other words, each VRF fallback policy will include a unique (i.e., different) combination of the predetermined network traffic information (144) and the VRF hierarchy (146). Details about how the VRF fallback priority is used are discussed in more detail below in FIGS. 2A-3C.

In one or more embodiments disclosed, the VRF hierarchy (146) may include some or all of the VRFs (136A, 136N) programmed on the routing network device. Additionally, the set of rules of the VRF fallback policy may specify which VRFs within the VRF hierarchy may be omitted (or do not matter) during a VRF lookup process (discussed below in FIGS. 2B-2E). For example, the set of rules (142) specified in the VRF fallback policy (140) may require that network traffic received at a specific interface of the routing network device (130) must be sent to another device for execution of network traffic services before the network traffic may be forwarded to any other devices. As a result, except for a default VRF set at a lowest level of the VRF hierarchy (146), all other VRFs (136A, 136N) programmed in the routing network device that do not forward the network traffic to another device for execution of network traffic services are determined as VRFs (136A, 136N) that may be omitted during the VRF lookup process.

One skilled in the art will recognize that the architecture of the system (100) and of the routing network device (130) is not limited to the components shown in FIGS. 1A-1B. For example, the system (100) may include any number of external-network network devices (105) and any number of datacenters (101). Further, the routing network device (130) may include components (e.g., a processor) not shown in FIG. 1B.

Figure 2A:
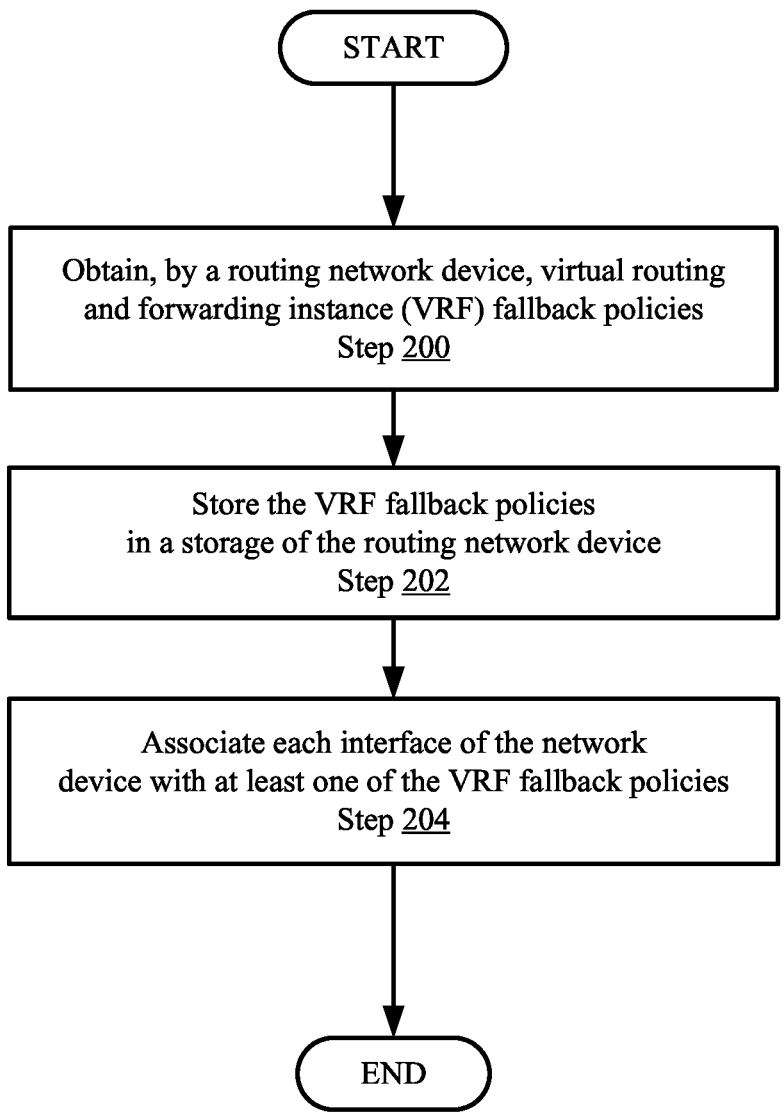
FIG. 2A shows a flowchart describing a routing network device configuration process in accordance with one or more embodiments described herein.

FIG. 2A shows a flowchart illustrating a routing network device configuration process in accordance with one or more embodiments described herein. The method of FIG. 2A may be performed by, for example, the routing network device (e.g., 103, FIG. 1A; 130, FIG. 1B). Other components illustrated in FIGS. 1A and 1B may perform the method of FIG. 2A without departing from the disclosure.

While FIG. 2A is illustrated as a series of steps, any of the steps may be omitted, performed in a different order, additional steps may be included, and/or any or all of the steps may be performed in a parallel and/or partially overlapping manner without departing from the disclosure.

In Step 200, one or more VRF fallback policies are obtained by the routing network device. In one or more embodiments, the VRF fallback policies may be obtained from any source (e.g., another network device, from a server, from a user and/or administrator of a datacenter, etc.). Once obtained, the VRF fallback policies are stored (in Step 202) in the storage (e.g., 138, FIG. 1B) of the routing network device.

In Step 204, each interface (i.e., port) (e.g., 132 & 134, FIG. 1B) of the routing network device is associated with at least one of the VRF fallback policies. This enables the routing network device to process one or more network traffic received at each interface using one of the VRF fallback policies. Details about processing network traffic using a VRF fallback policy are discussed below in FIGS. 2B-2E.

Figure 2B:
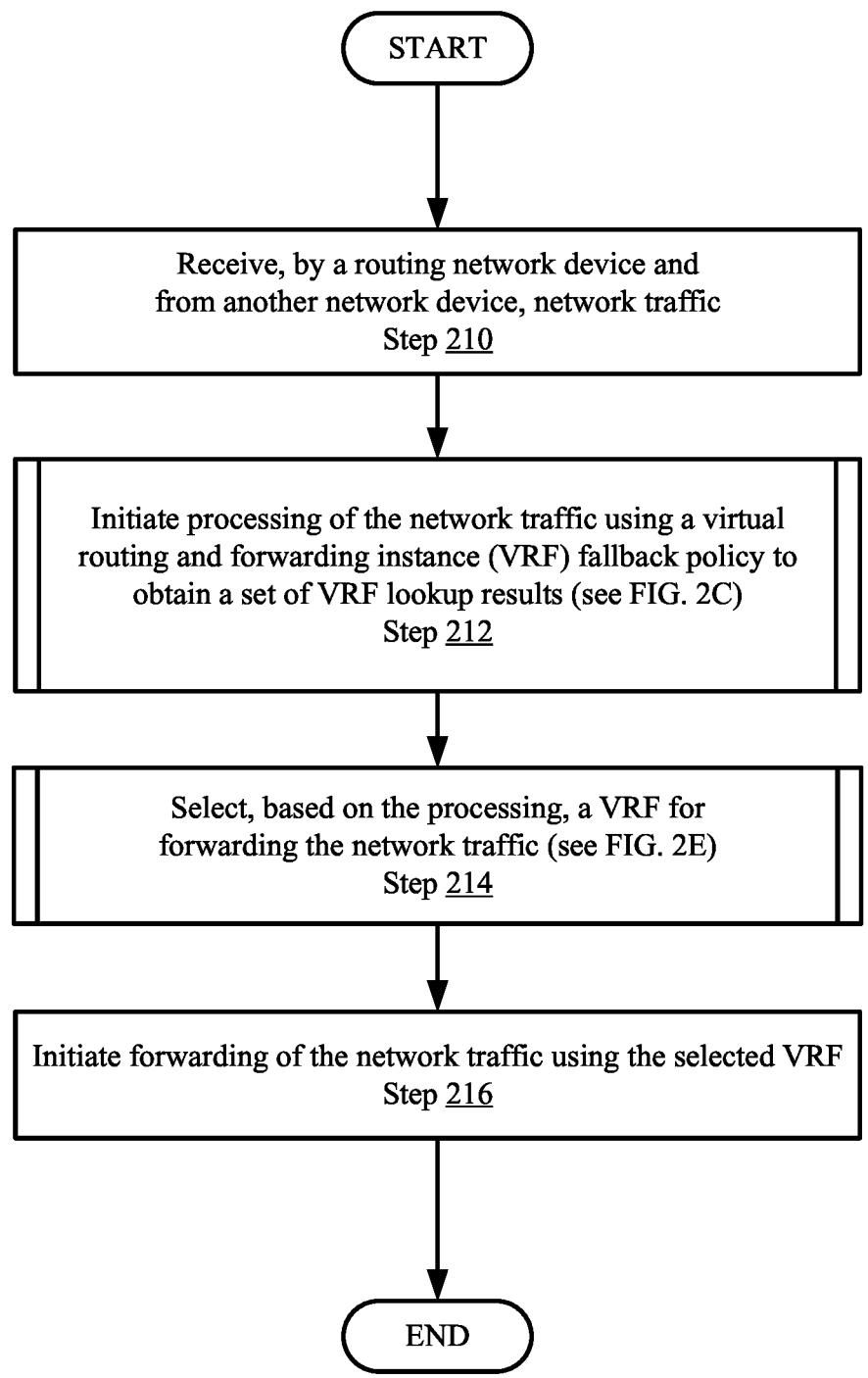
FIGS. 2B-2E show flowcharts describing a network traffic engineering process in accordance with one or more embodiments described herein.
Figure 2C:
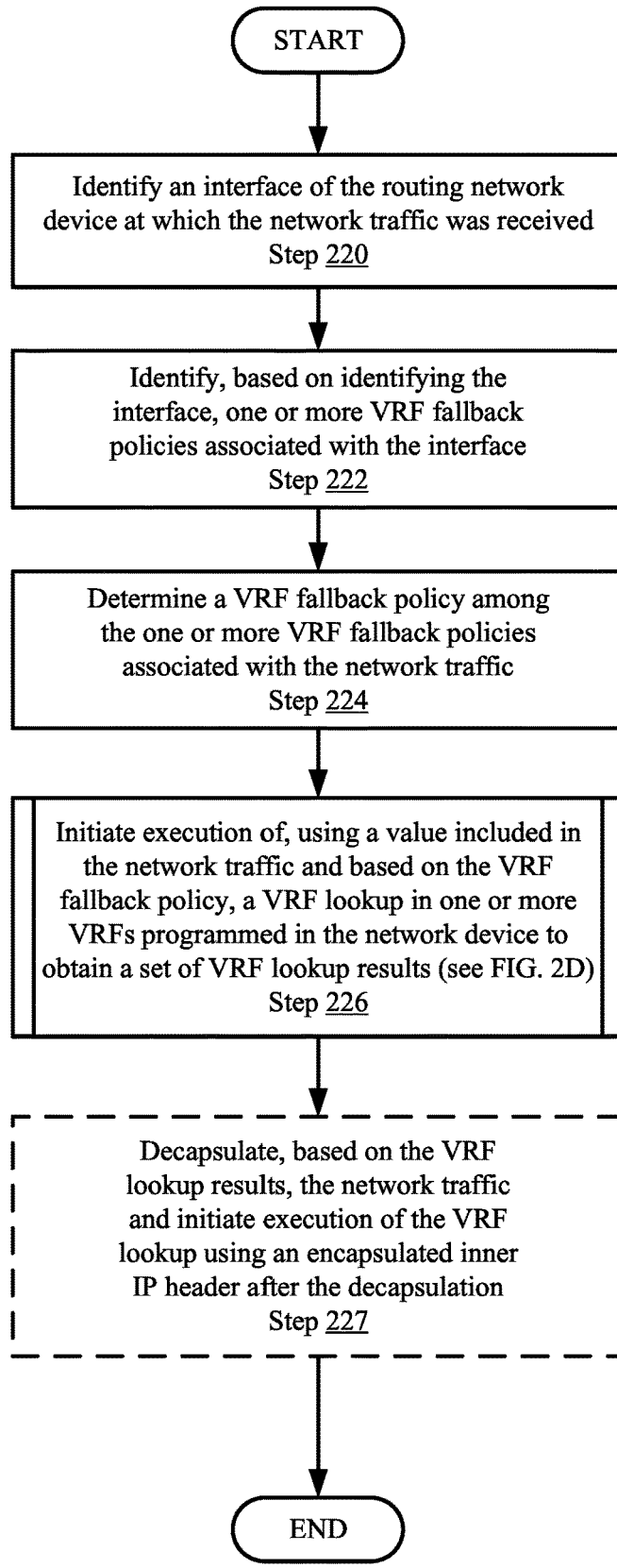
Figure 2D:
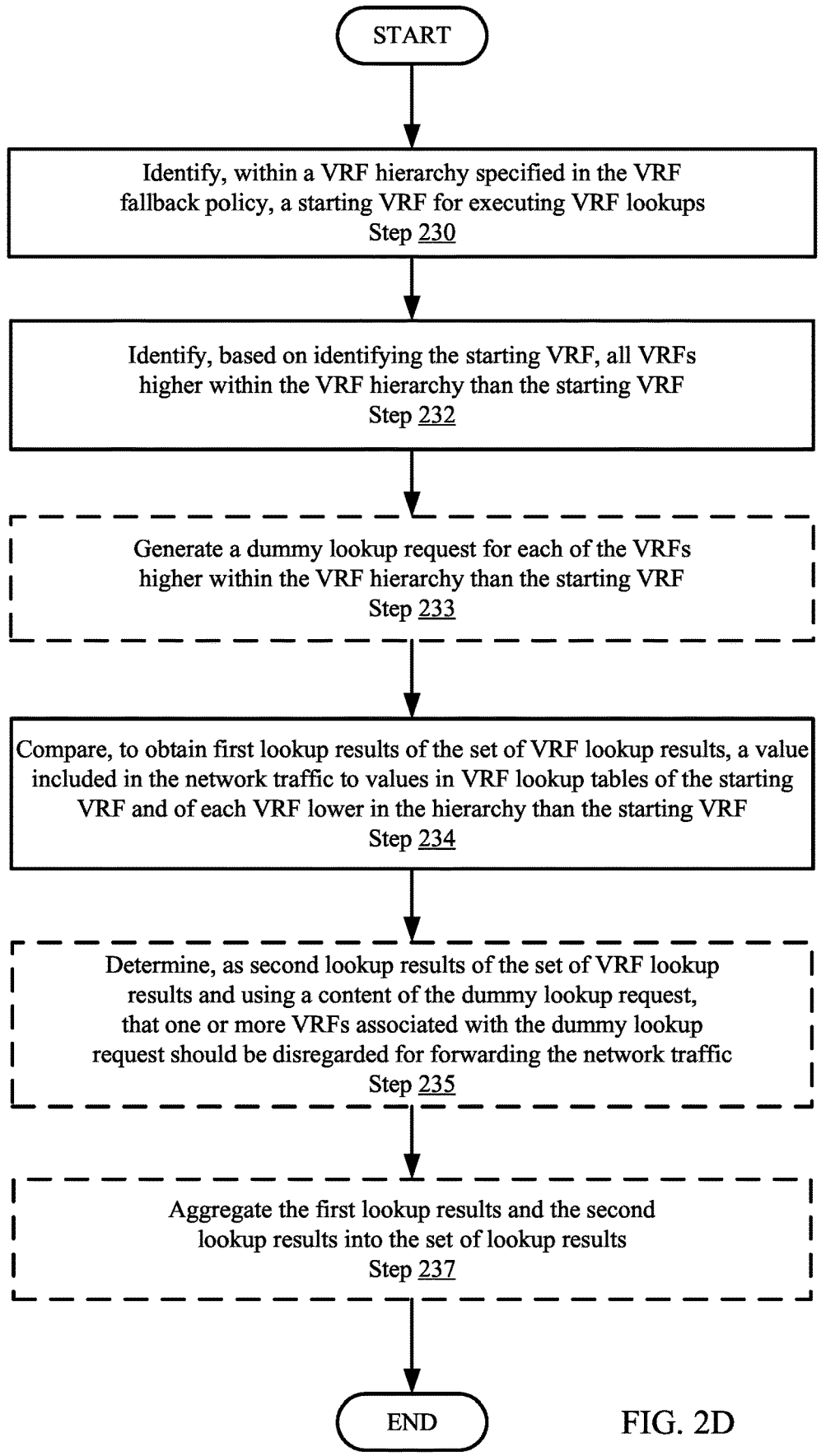

FIGS. 2B-2D show a flowchart illustrating a network traffic engineering process in accordance with one or more embodiments described herein. The method of FIGS. 2B-2D may be performed by, for example, the routing network device (e.g., 103, FIG. 1A; 130, FIG. 1B). Other components illustrated in FIGS. 1A and 1B may perform the method of FIGS. 2B-2D without departing from the disclosure.

While FIGS. 2B-2D are illustrated as a series of steps, any of the steps may be omitted, performed in a different order, additional steps may be included, and/or any or all of the steps may be performed in a parallel and/or partially overlapping manner without departing from the disclosure.

Turning now to FIG. 2B, in Step 210, a network traffic (e.g., a data packet) is received by the routing network device. In one or more embodiments, the network traffic may be received from any source (i.e., from any device shown in the system (100) of FIG. 1A) and may be in any size and/or format. The network traffic may include at least a header portion specifying information about the network traffic (i.e., a packet type, a destination IP, etc.) and a payload portion including a content (i.e., one or more pieces of data) of the network traffic. In one or more embodiments, the network traffic may be encapsulated.

In Step 212, processing of the network traffic using a VRF fallback policy is initiated to obtain a set of VRF lookup results. The VRF lookup results specify one or more VRFs that can be used to forward the network traffic to another device. This is described in more detail below in FIG. 2C.

In Step 214, a VRF for forwarding the network traffic is selected based on the processing in Step 212. In particular, the VRF fallback policy specifies which of the one or more VRFs determined in Step 212 is to be chosen to forward the network traffic. This is described in more detail below in FIG. 2E.

In Step 216, forwarding of the network traffic using the selected VRF is initiated. In one or more embodiments, the routing network device (e.g., 130, FIG. 1B) executes one or more processes to forward the network traffic to another device using the selected VRF.

Turning now to FIG. 2C, a process of initiating processing of the network traffic using a VRF fallback policy as described above in reference to Step 212 of FIG. 2B will now be described.

In particular, in Step 220, an interface of the routing network device at which the network traffic was received is identified. Once identified, in Step 222, one or more VRF fallback policies associated with the interface is identified by the routing network device.

In Step 224, a VRF fallback policy among the one or more VRF fallback policies associated with the interface that is associated with the network traffic is determined (i.e., identified). In one or more embodiments, the routing network device compares the predetermined network traffic information (e.g., 144, FIG. 1B) specified in each set of rules (e.g., 142, FIG. 1B) of each VRF fallback policy with information included in the network traffic (namely, information included in a header of the network traffic). If the information included in the network traffic matches the predetermined network traffic information (144) of one VRF fallback policy among the VRF fallback policies, that VRF fallback policy is selected to process the network traffic (i.e., process the forwarding of the network traffic).

In Step 226, executing of a VRF lookup in one or more VRFs programmed in the network device to obtain a set of VRF lookup results is initiated. In one or more embodiments, this execution of the VRF lookups is initiated by the routing network device using a value (e.g., an IP header) included in the network traffic. The VRFs to be used for the VRF lookups are based on the VRFs specified in a VRF hierarchy (e.g., 146, FIG. 1B) included in the VRF fallback policy identified in Step 224. In one or more embodiments, all of the VRF lookups may be executed in parallel, or serially within one or more groups of VRFs (where the VRF lookups for the VRFs in each group are performed in parallel). Additional details about the VRF lookup process are discussed below in FIG. 2D.

In Step 227, based on a result of the VRF lookups in Step 226, the routing network device may decapsulate the network traffic and initiate execution of the VRF lookup using a value resulting from the decapsulation. For example, in one or more embodiments, during the execution of the VRF lookups in Step 226, the routing network device may determine that the network traffic is encapsulated. In particular, the routing network device may determine that the network device includes an outer IP header and an encapsulated inner IP header. As a result, the routing network device initiates a decapsulation process to decapsulate the network traffic and uses a value from the encapsulated inner IP header for executing a VRF lookup process after the decapsulation.

Turning now to FIG. 2D, a process of executing the VRF lookups as described above in reference to Step 226 of FIG. 2C will now be described.

In particular, in Step 230, a starting VRF for executing VRF lookups is identified within a VRF hierarchy specified in the VRF fallback policy. In one or more embodiments, the starting VRF is a VRF within the VRF hierarchy specified in the VRF fallback policy, and may be specified in the set of rules of the VRF fallback policy. For example, assume that a user requires that all traffic received at an external-facing interface of the routing network device must be processed using one or more network traffic services for security reasons, the starting VRF specified in a VRF fallback policy associated with the external-facing interface will be a first VRF within the VRF hierarchy that forwards the network traffic to a device that performs said network traffic services.

In Step 232, all VRFs higher within the VRF hierarchy than the starting VRF are identified. In one or more embodiments, once all of the VRFs higher within the VRF hierarchy than the starting VRF are identified, the process may (in Step 233) generate dummy lookup requests for each of the VRFs higher within the VRF hierarchy than the starting VRF. The dummy lookup request may be generated by the routing network device and may include an invalid VRF ID (or any other combination of alphanumeric characters) that will trigger the routing network device to disregard (i.e., not use) one or more VRFs for which the dummy lookup request is generated. Said another way, the dummy lookup request may include any type of content that would trigger the routing network device to disregard the dummy lookup request and not use the one or more VRFs for which the dummy lookup request is generated.

In Step 234, a value (e.g., an IP header) included in the network traffic is compared to values included in a VRF lookup table of the starting VRF and in VRF lookup tables of each VRF lower in the VRF hierarchy than the starting VRF. In one or more embodiments, this comparison in Step 234 is executed by the routing network device to obtain (i.e., generate) first lookup results of the set of VRF lookup results discussed above in reference to Step 226 of FIG. 2C. In particular, the routing network device executes the comparison to determine whether any of the VRF lookup tables includes an entry that matches (i.e., is identical to) the value included in the network traffic. All VRFs with VRF lookup tables including this identical entry are determined by the network device as VRFs that are able to forward the network traffic.

In Step 235, a content of each dummy lookup request generated in Step 233, may be analyzed by the routing network device to generate second lookup results. As discussed above in Step 233, the content of each dummy lookup request triggers the routing network device to determine that the VRFs for which each dummy lookup request is generated should be disregarded (i.e., should not be used for forwarding any network traffic). This result of disregarding one or more VRFs is used as the second lookup results. In Step 237, the first lookup results and the second lookup results may be aggregated to generate the set of VRF lookup results.

Although the above process discussed in FIG. 2D is described as including Steps 233, 235, and 237, these Steps may be omitted in one or more embodiments. In particular, based on a configuration of a hardware of the routing network device, all VRFs where no lookup results are required (i.e., all VRFs higher in the VRF hierarchy than the starting VRF) may be omitted during the execution of the VRF lookup process.

Figure 2E:
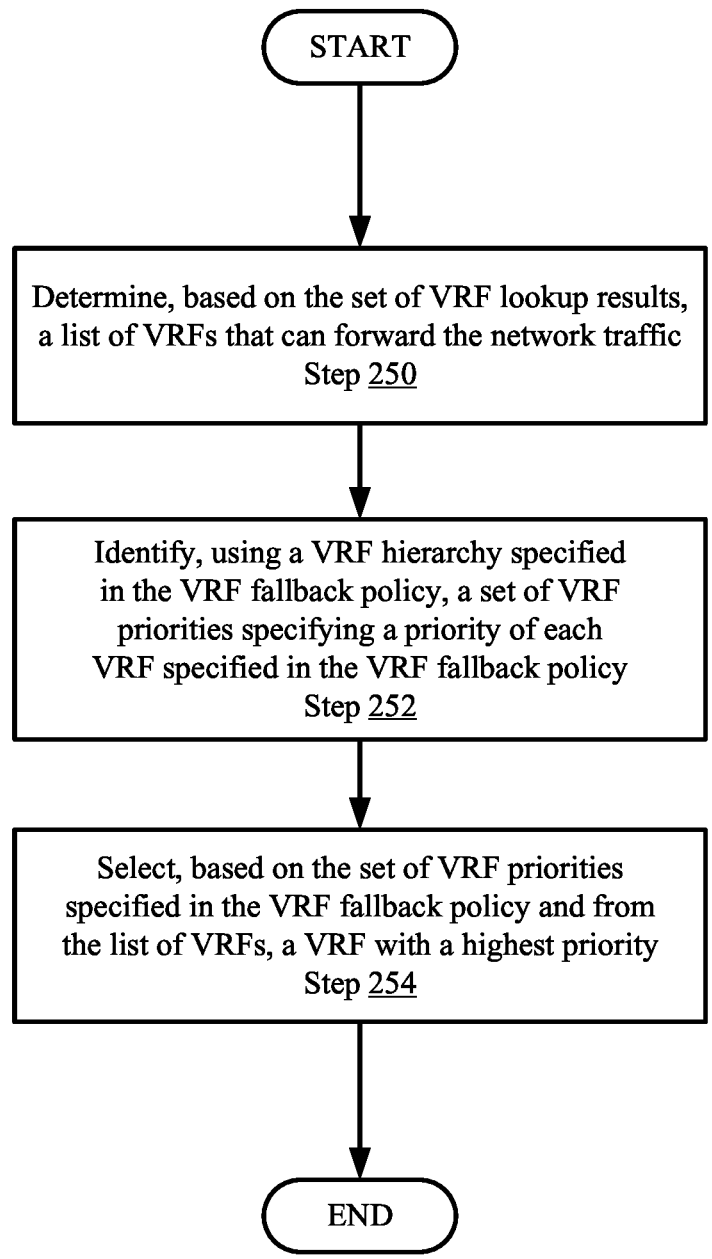

Turning now to FIG. 2E, the process for selecting a VRF for forwarding the network traffic as discussed above in Step 214 of FIG. 2B will now be discussed in more detail below.

In particular, in Step 250, a list of VRFs that can be used to forward the network traffic is determined based on the set of VRF lookup results. As discussed above, all VRFs with VRF lookup tables including an entry that matches with a value of the network traffic used during the VRF lookups are determined as VRFs that can be used to forward the network traffic.

In Step 252, a set of VRF priorities specifying a priority of each VRF specified in the VRF fallback policy is identified using the VRF hierarchy specified in the VRF fallback policy. In one or more embodiments, VRFs that are higher in the VRF hierarchy have higher priority to forward the network traffic, or vice versa. Said another way, the hierarchical relationship established in the VRF hierarchy may be used to determine which VRF in the identified list of VRFs has a highest priority to be used to forward the network traffic.

In Step 254, a VRF within the list of VRFs with the highest priority is selected for forwarding the network traffic. As discussed above, in one or more embodiments, the VRF with the highest priority is selected based on the set of VRF priorities specified in the VRF hierarchy of the VRF fallback policy.

Figure 3A:
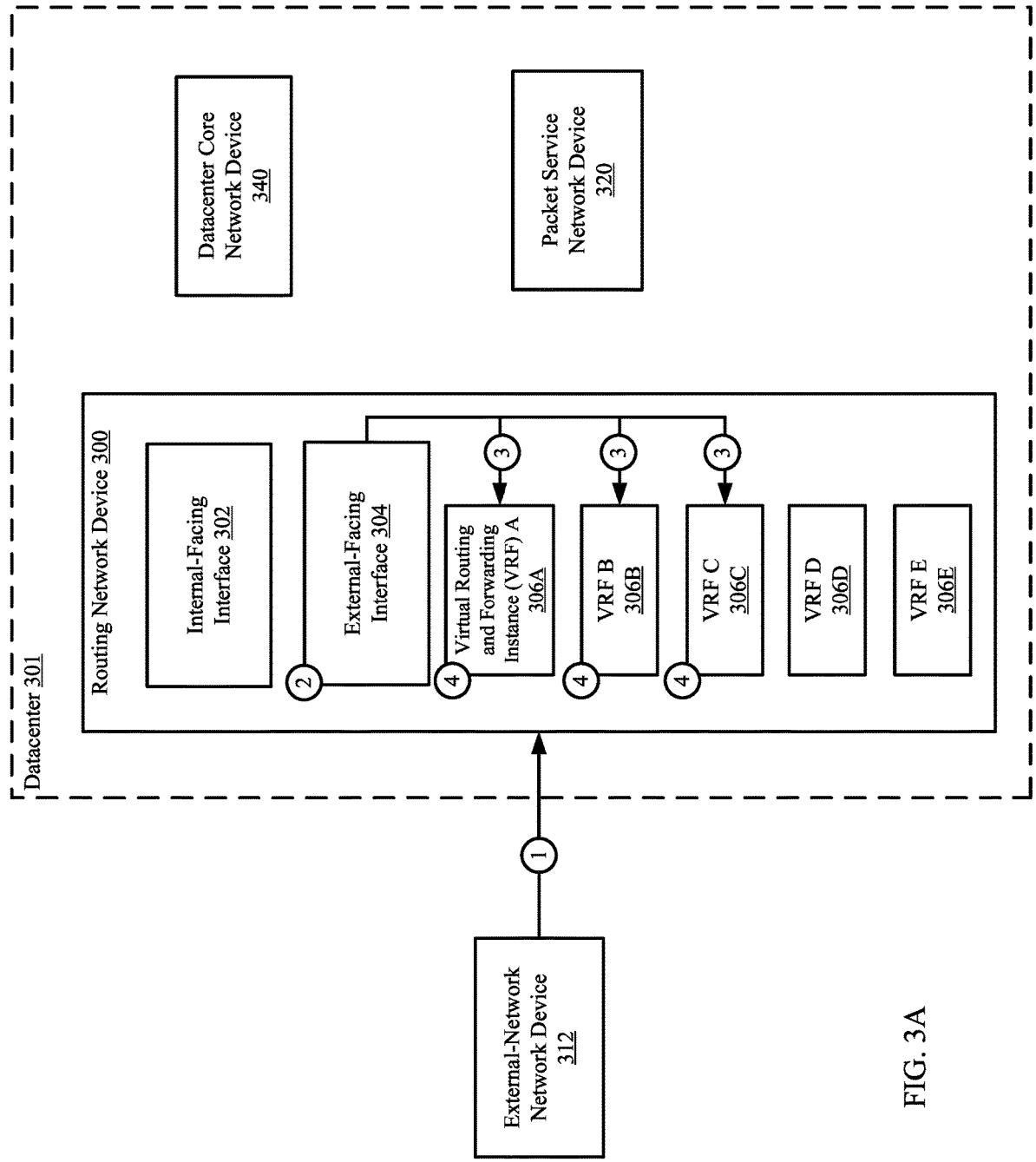
FIGS. 3A-3C show an example in accordance with one or more embodiments described herein.
Figure 3B:
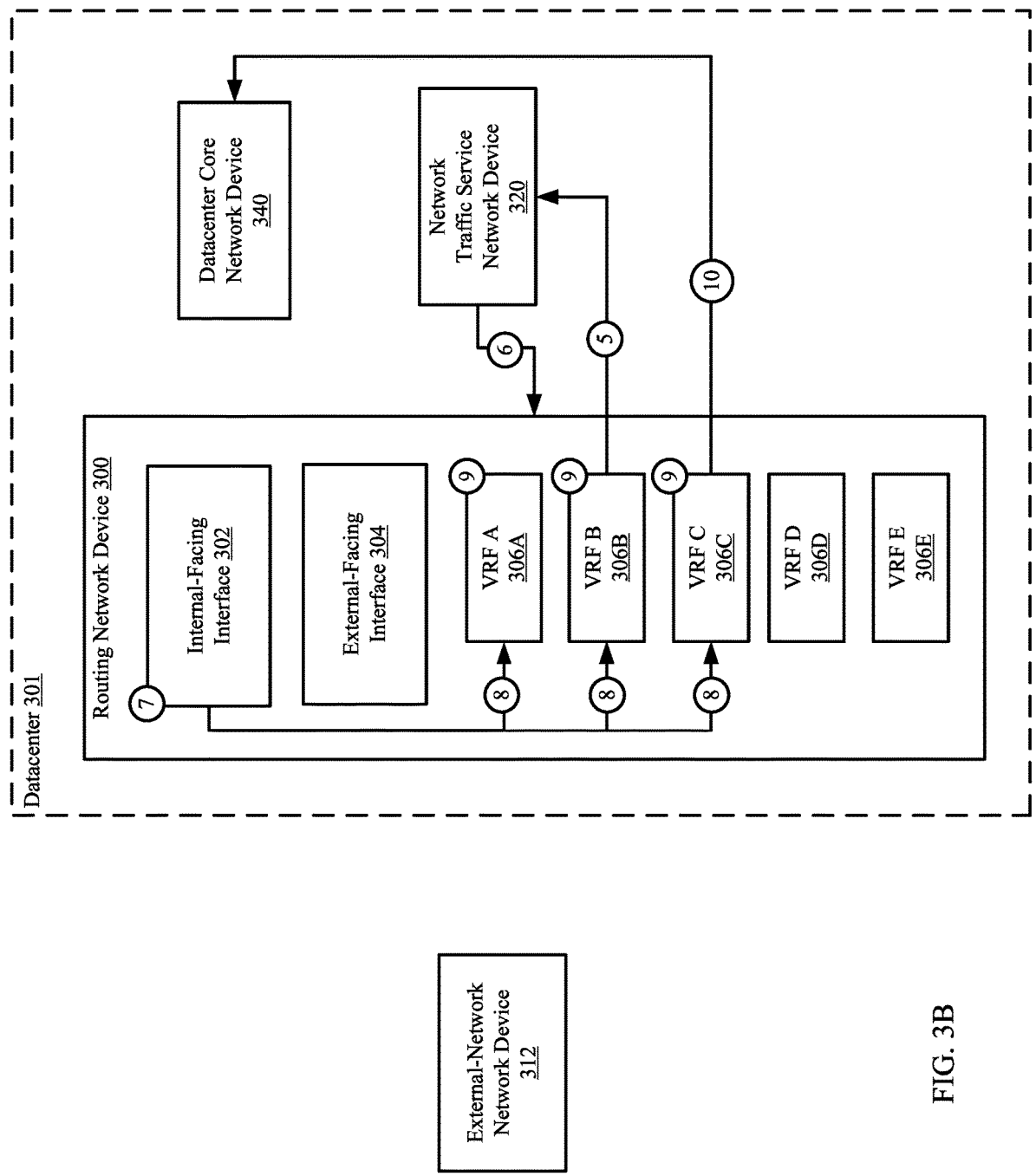
Figure 3C:
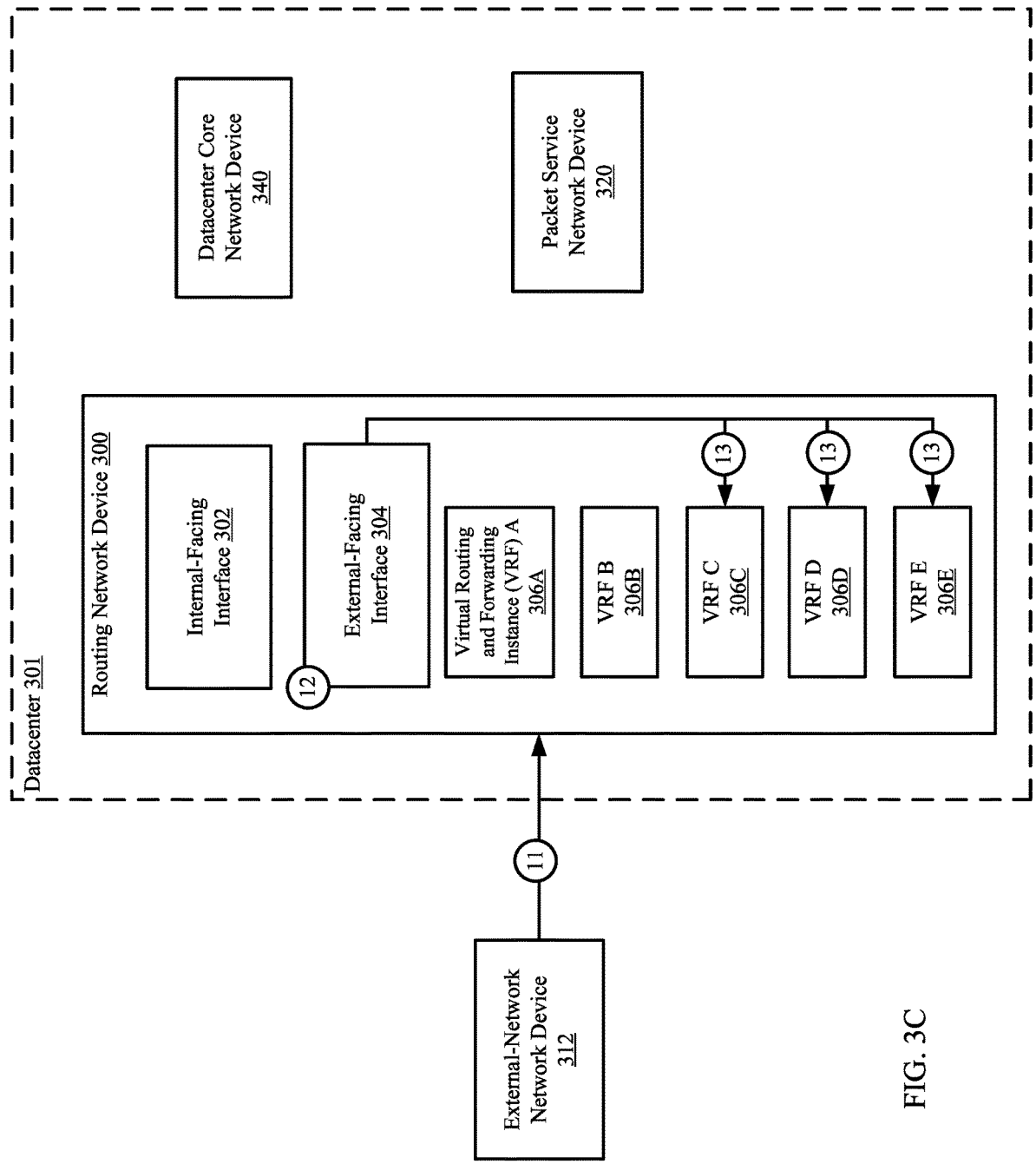

To further clarify embodiments disclosed herein, a non-limiting working example of network traffic engineering using multi-VRF lookups is provided in FIGS. 3A-3C. The working example is intended to highlight various aspects of the disclosure. However, the working example should not be construed as limiting the disclosure in any way.

Start of Non-Limiting Example

An external-network network device (312) transmits network traffic (e.g., a data packet) to routing network device (300) of datacenter (301) [1]. The network traffic is received at the external-facing interface (304) of the routing network device (300), and the routing network device (300) determines that a first VRF fallback policy among multiple VRF fallback policies associated with the external-facing interface (304) should be used to process the network traffic [2]. In this example, the first VRF policy specifies the priority of the VRFs to be VRF A, VRF B, VRF C, from highest to lowest priority. Once the network traffic is received, three lookups are performed based on a VRF hierarchy specified in the first VRF fallback policy; however, because the first VRF fallback policy specifies VRF B as the starting VRF, the lookup in VRF A is performed using a dummy lookup request while the lookups in VRFs B and C are performed using portions of the headers in the network traffic [3]. The results of the three lookups are subsequently processed based on the first VRF fallback policy, which in this example is, from highest to lowest priority, VRF A>VRF B>VRF C (i.e., the VRF hierarchy). Thus, in this example the result from lookup in VRF A will not return a match as the lookup used a dummy value; however, a result may be returned from one or both of the lookups in VRFs B and C. In this example, assume that both lookups returned a result, in this scenario, because VRF B is higher in the VRF hierarchy than VRF C, the result from VRF B is used to process the received network traffic [4].

Turning now to FIG. 3B, in response to selecting VRF B (306B), the network traffic is forwarded, based on the results of the lookup in VRF B, to a network traffic service network device (320) [5].

Continuing with the example, the network traffic service network device (320) processes the network traffic and transmits the processed network traffic back to the routing network device (300) [6]. The network traffic from the network traffic service network device (320) is received at the internal-facing interface (302) of the routing network device (300), and the routing network device (300) determines that a second VRF fallback policy (different from the first VRF fallback policy) among multiple VRF fallback policies associated with the internal-facing interface (302) should be used to process the network traffic [7]. Once the network traffic is received, three lookups are performed using VRFs A-C (306A-306C)) [8]. VRFs A-C execute VRF lookups based on the second VRF fallback policy [9]. VRF C (306C) is selected based on the VRF lookup results and the VRF hierarchy. More specifically, in this example, there is no match in VRF A or VRF B but there is a match in VRF C. Thus, the network traffic is processed using the resulting lookup from VRF C and, as such, is forwarded by VRF C to a datacenter core network device (340) [10].

Turning now to FIG. 3C, external-network network device (312) transmits a second network traffic to the routing network device (300) [11]. This time, however, the routing network device (300) determines that a third VRF fallback policy (different from the first and second VRF fallback policies) associated with the external-facing interface (304) should be used to process the network traffic [12]. This third VRF fallback policy specifies a VRF hierarchy including VRFs C, D, and E (306C-306E). As a result, the VRF lookup for this second network traffic is conducted using VRFs C, D, and E (306C-306E) instead of using VRFs A, B, and C (306A-306C) as with the previous network traffic [13].

Figure 4:
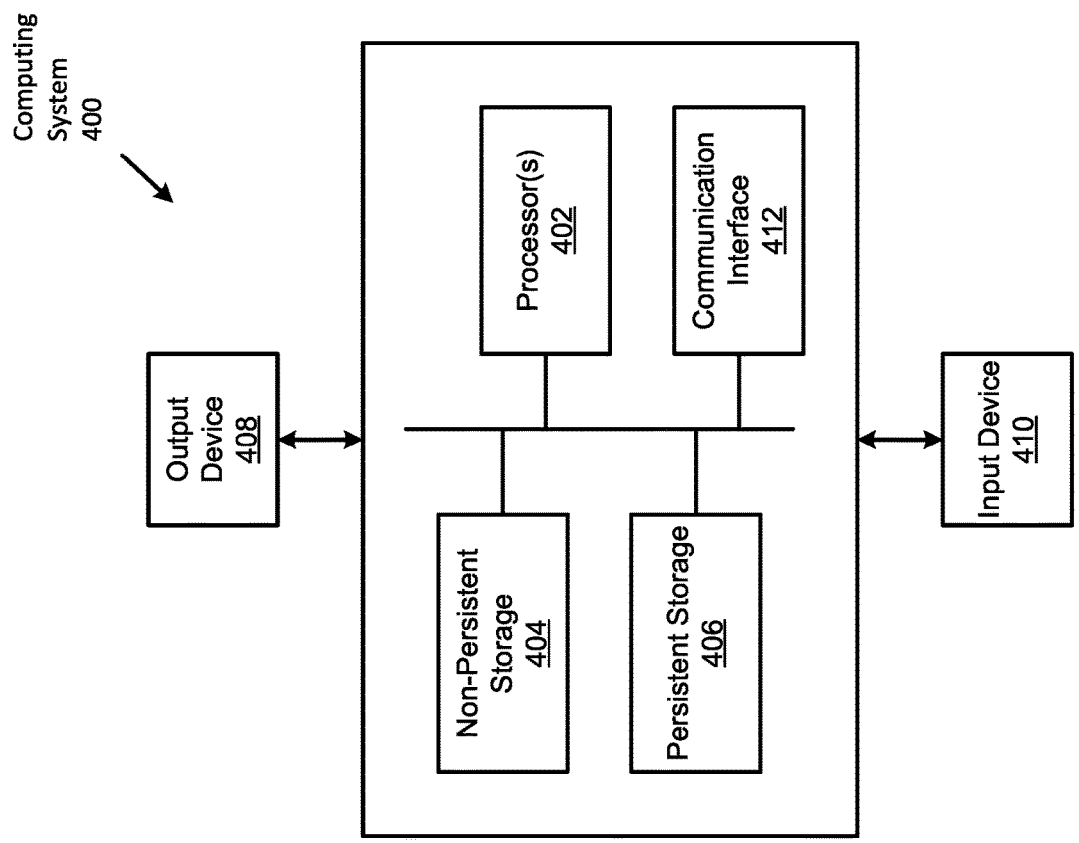
FIG. 4 shows a diagram of a computing device in accordance with one or more embodiments described herein.

As discussed above, embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

Embodiments described herein eliminate the need for network traffic recirculation after a lookup is performed in each VRF. In particular, all lookups for VRFs programmed in the network device may be executed in parallel, or serially within groups (where the lookups for the VRFs in each group are performed in parallel) upon receipt of the network traffic. This advantageously improves the computer functionalities of each network device performing the VRF lookups by preventing computing resources from being wasted by recirculation of the network traffic. This also advantageously reduces latency in the processing of the network traffic.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A network device comprising:
a plurality of virtual routing and forwarding instances (VRFs) comprising a first VRF having a first VRF lookup table and a second VRF having a second VRF lookup table;
a storage storing:
 a first VRF fallback policy specifying a first set of rules comprising:
  predetermined network traffic information,
  a first VRF hierarchy associated with the plurality of VRFs, wherein the first VRF hierarchy specifies a set of VRF priorities including a priority of the first VRF and a priority of the second VRF, and
  information specifying that the first VRF is a starting VRF for executing VRF lookups,
 the first VRF lookup table, and
 the second VRF lookup table; and
a processor coupled to the storage;
an interface coupled to the processor, wherein the interface is associated with the first VRF fallback policy, and
wherein the processor is configured to:
 receive a network traffic;
 make a first determination, in response to receiving the network traffic, wherein the first determination includes: that the network traffic is received at the interface, that the interface is associated with the first VRF fallback policy, that the network traffic includes network traffic information matching the predetermined network traffic information of the first VRF fallback policy, and, that the first VRF is a starting point for executing VRF lookups, and wherein the determination that the first VRF is the starting point is based on the first VRF fallback policy associated with the interface, the first VRF and the second VRF;

initiate, subsequent to the first determination based on the first VRF fallback policy, and to obtain a first set of VRF lookup results, execution of:
  a first VRF lookup among the VRF lookups comparing a value included in the network traffic to values in the first VRF lookup table to obtain a first result of the first set of VRF lookup results, and
  a second VRF lookup among the VRF lookups comparing the value included in the network traffic to values in the second VRF lookup table obtain a second result of the first set of VRF lookup results;

make a second determination, based on the first set of VRF lookup results, that the network traffic can be forwarded using the first VRF and the second VRF;

make a third determination, using the first set of VRF priorities and in response to the second determination, that the priority of the first VRF is higher than the priority of the second VRF;

select, based on the third determination, the first VRF; and initiate, based on the selecting, forwarding of the network traffic using the first VRF.

2. The network device of claim 1, wherein the storage further stores a second VRF fallback policy specifying a second set of rules comprising:

second predetermined network traffic information different from the first predetermined network traffic information;

a second VRF hierarchy including the first VRF and the second VRF; and the second VRF is a starting VRF for executing VRF lookups, the interface is further associated with the second VRF fallback policy; and the processor is further configured to:
  receive a second network traffic;
  make a fourth determination, in response to receiving the second network traffic, that the second network traffic is received at the interface and includes second network traffic information matching the second predetermined network traffic information;
  generate, in response to the fourth determination, a dummy lookup request to be used for a third VRF lookup associated with the first VRF;
  initiate, based on the fourth determination and to obtain a second set of VRF lookup results, executing of:
    the third VRF lookup using the dummy lookup request to obtain a first result of the second set of VRF lookup results, and
    a fourth VRF lookup comparing a value in the second network traffic to the values in the second VRF lookup table obtain a second result of the second set of VRF lookup results;
  make a fifth determination, based on the second set of VRF lookup results, that the network traffic can only be forwarded using the second VRF;
  selecting, based on the fifth determination, the second VRF; and
  initiate, based on the selecting, forwarding of the second network traffic using the second VRF.

3. The network device of claim 2, wherein the first VRF lookup and the second VRF lookup are executed in parallel, and the third VRF lookup and the fourth VRF lookup are executed in parallel.

4. A method for network traffic forwarding using multi-virtual routing and forwarding instances (multi-VRF) forwarding lookups in a network device among a plurality network devices connected to a network, the method comprising:

receiving, from a second network device among the network devices, network traffic on an interface of the network device associated with a first virtual routing and forwarding instance (VRF) fallback policy, wherein the first VRF fallback policy specifies a first set of rules;

making a first determination, in response to receiving the network traffic, wherein the first determination includes: that the network traffic is received at the interface, that the interface is associated with the first VRF fallback policy, that the network traffic includes network traffic information matching information specified in the first set of rules of the first VRF fallback policy, and, based on the first VRF fallback policy, a plurality of VRFs;

initiating execution of, subsequent to the first determination and using a value included in the network traffic, VRF lookups in the plurality of VRFs programmed in the network device to obtain a set of VRF lookup results;

making a second determination, using the set of VRF lookup results and the first VRF fallback policy, that the network traffic is to be forwarded using a first VRF among the plurality of VRFs; and initiating, based on the second determination, forwarding of the network traffic using the first VRF.

5. The method of claim 4, wherein the first set of rules comprises:

predetermined network traffic information;

a first VRF hierarchy specifying the first VRF as being highest among the plurality of VRFs within the first VRF hierarchy;

information specifying that the set of VRF lookup starts at the first VRF; and the first determination comprises determining that the network traffic information of the network traffic matches the predetermined network traffic information.

6. The method of claim 5, wherein the plurality of VRFs includes the first VRF, a second VRF, and a third VRF, and the first VRF hierarchy specifies that the first VRF is higher in priority than the second VRF and that the second VRF is higher in priority than the third VRF.

7. The method of claim 5, wherein the first VRF hierarchy specifies a set of VRF priorities, and the set of VRF priorities specifies a priority of each of the first VRF, the second VRF, and the third VRF in being selected to forward the network traffic.

8. The method of claim 7, wherein determining that the network traffic is to be forwarded using the first VRF comprises:

making a third determination, based on the set of VRF lookup results, that the network traffic can be forwarded using all of the first VRF, the second VRF, and the third VRF;

making a fourth determination, using the set of VRF priorities and in response to the fourth determination, that a priority of the first VRF is higher than a priority of the second VRF and a priority of the third VRF; and selecting, based on the third determination, the first VRF for forwarding the network traffic.

9. The method of claim 6, wherein initiating execution of the VRF lookups comprises:
   executing a first VRF lookup by comparing the value included in the network traffic to values in a first VRF lookup table of the first VRF to obtain a first lookup result;
   executing a second VRF lookup comparing the value included in the network traffic to values in a second VRF lookup table of the second VRF to obtain a second lookup result;
   executing a third VRF lookup comparing the value included in the network traffic to values in a third VRF lookup table of the third VRF to obtain a third lookup result; and
   aggregating the first lookup result, the second lookup result, and the third lookup result into the set of VRF lookup results.

10. The method of claim 9, wherein at least two of the first VRF lookup, the second VRF lookup, and the third VRF lookup are executed in parallel.

11. The method of claim 9, wherein the first VRF lookup, the second VRF lookup, and the third VRF lookup are executed consecutively in series.

12. The method of claim 4, wherein the plurality of VRFs comprises the first VRF, a second VRF, and a third VRF, and the method further comprising:
   receiving, at the interface and from a third network device among the network devices, a second network traffic, wherein the interface is further associated with a second VRF fallback policy specifying a second set of rules;
   making a third determination, in response to receiving the second network traffic, that the second network traffic includes second network traffic information matching information specified in the second set of rules, wherein the second set of rules comprises:
      second predetermined network traffic information; and
      a second VRF hierarchy comprising the first VRF, the second VRF and the third VRF and specifying that:
         the second VRF is a starting VRF for executing VRF lookups, the first VRF is higher than the second VRF in the second VRF hierarchy, and the second VRF is higher than the third VRF in the second VRF hierarchy; and
      processing, based on the third determination, the second network traffic using the second VRF fallback policy, wherein the third determination comprises determining that the second network traffic information of the second network traffic matches the second predetermined network traffic information.

13. The method of claim 12, wherein processing the second network traffic using the second VRF fallback policy comprises:
   in response to the third determination and using a value included in the second network traffic:
      generating a dummy lookup request to be used for a first VRF lookup, among the VRF lookups, associated with the first VRF;
      executing the first VRF lookup using the dummy lookup request to obtain a first lookup result;
      executing a second VRF lookup among the VRF lookups comparing the value included in the second network traffic to values in a second VRF lookup table of the second VRF to obtain a second lookup result;
      executing a third VRF lookup among the VRF lookups comparing the value included in the second network traffic to values in a third VRF lookup table of the third VRF to obtain a third lookup result; and
      aggregating the first lookup result, the second lookup result, and the third lookup result into a second set of VRF lookup results;
   making a fourth determination, using the second set of VRF lookup results, that the second network traffic can be forwarded using only the second VRF and the third VRF;
   selecting, in response to the fourth determination and based on the second VRF hierarchy, the second VRF, and
   initiate, based on selecting the second VRF, forwarding of the second network traffic using the second VRF.

14. A method for network traffic forwarding using multi-virtual routing and forwarding instances (multi-VRF) forwarding lookups in a network device among a plurality of network devices connected to a network, the method comprising:
   receiving a first network traffic on a first interface of the network device and a second network traffic on a second interface of the network device;
   making a first determination, in response to receiving the first network traffic on the first interface and the second network traffic on the second interface, that:
   the first interface is associated with a first virtual routing and forwarding instance (VRF) fallback policy specifying a first set of rules, and
   the second interface is associated with a second VRF fallback policy specifying a second set of rules different from the first set of rules;
   making a second determination that:
   the first network traffic includes first network traffic information matching information specified in the first set of rules,
   the second network traffic includes second network traffic information matching information specified in the second set of rules,
   based on the first VRF fallback policy, one of a plurality of VRFs programmed in the network device is to be used for executing VRF lookups for the first network traffic, and
   based on the second VRF fallback policy, one of the plurality of VRFs programmed in the network device is to be used for executing VRF lookups for the second network traffic; and
   initiating, based on the second determination, forwarding of the first network traffic and the second network traffic using the one of the plurality of VRFs programmed in the network device based respectively on the first set of rules and the second set of rules, wherein the forwarding includes performing a lookup in one of the plurality of VRFs subsequent to the second determination, and initiating forwarding of the first network traffic comprises:
      initiating execution of, using a first value included in the first network traffic, VRF lookups in the plurality of VRFs to obtain a set of VRF lookup results;
   making a third determination, using the set of VRF lookup results and the first VRF fallback policy, that the first network traffic is to be forwarded using a first VRF among the plurality of VRFs; and initiating, based on the second determination, forwarding of the first network traffic using the first VRF.

15. The method of claim 14, wherein
the plurality of VRFs includes the first VRF, a second VRF, and a third VRF,
the first set of rules comprises:
first predetermined network traffic information;
a first VRF hierarchy specifying the first VRF as being highest in priority among the plurality of VRFs within the first VRF hierarchy; and
information specifying that the VRF lookup start at the first VRF,
the second determination further comprises determining that the first network traffic information of the network traffic matches the first predetermined network traffic information.

16. The method of claim 15, wherein initiating execution of the VRF lookups comprises:
executing a first VRF lookup by comparing the first value included in the network traffic to values in a first VRF lookup table of the first VRF to obtain a first lookup result;
executing a second VRF lookup comparing the first value included in the network traffic to values in a second VRF lookup table of the second VRF to obtain a second lookup result;
executing a third VRF lookup comparing the first value included in the network traffic to values in a third VRF lookup table of the third VRF to obtain a third lookup result; and
aggregating the first lookup result, the second lookup result, and the third lookup result into the set of VRF lookup results.

17. The method of claim 16, wherein the first VRF lookup, the second VRF lookup, and the third VRF lookup are executed in parallel.

18. The method of claim 15, wherein
the second set of rules comprises:
second predetermined network traffic information; and
a second VRF hierarchy comprising the first VRF, the second VRF and the third VRF and specifying that:
the second VRF is a starting VRF for executing VRF lookups,
the first VRF is higher than the second VRF in the second VRF hierarchy, and
the second VRF is higher than the third VRF in the second VRF hierarchy, and
the second determination further comprises determining that the second network traffic information of the network traffic matches the second predetermined network traffic information.

19. The method of claim 18, wherein initiating forwarding of the second network traffic using one of the plurality of VRFs based on the second set of rules comprises:
processing the second network traffic using the second VRF fallback policy, and
wherein the processing comprises:
generating a dummy lookup request to be used for a first VRF lookup, among the VRF lookups, associated with the first VRF;
executing the first VRF lookup using the dummy lookup request to obtain a first lookup result;
executing a second VRF lookup among the VRF lookups comparing a second value included in the second network traffic to values in a second VRF lookup table of the second VRF to obtain a second lookup result;
executing a third VRF lookup among the VRF lookups comparing the second value included in the second network traffic to values in a third VRF lookup table of the third VRF to obtain a third lookup result;
aggregating the first lookup result, the second lookup result, and the third lookup result into a second set of VRF lookup results;
making a third determination, using the second set of VRF lookup results, that the second network traffic can be forwarded using only the second VRF and the third VRF;
selecting, in response to the third determination and based on the second VRF hierarchy, the second VRF, and
initiate, based on selecting the second VRF, forwarding of the second network traffic using the second VRF.

* * * * *